United States Patent
Contini et al.

(10) Patent No.: US 6,827,962 B2
(45) Date of Patent: Dec. 7, 2004

(54) BALSAMIC SAUCE FOR ALIMENTARY USE, WITH A BASIS OF BALSAMIC VINEGAR OF MODENA

(75) Inventors: Arturo Contini, Camposanto (IT); Alberto Rosta, Camposanto (IT); Andrea Boccafoli, Vimercate (IT)

(73) Assignee: Acetum S.R.L., Cavezzo (IT)

( * ) Notice: Subject to any disclaimer, the term of this patent is extended or adjusted under 35 U.S.C. 154(b) by 118 days.

(21) Appl. No.: 09/897,986

(22) Filed: Jul. 5, 2001

(65) Prior Publication Data

US 2002/0081364 A1 Jun. 27, 2002

(30) Foreign Application Priority Data

Dec. 27, 2000 (IT) ..................................... MI2000A2832

(51) Int. Cl.[7] ................................................ A23L 1/39
(52) U.S. Cl. ....................................... 426/589; 426/650
(58) Field of Search ................................ 426/589, 650; 99/323.11

(56) References Cited

U.S. PATENT DOCUMENTS

| | | | | |
|---|---|---|---|---|
| 4,252,835 A | * | 2/1981 | Maerker et al. ............ | 426/589 |
| 4,935,259 A | * | 6/1990 | Vella ........................... | 426/589 |
| 5,221,550 A | * | 6/1993 | Freeman ...................... | 426/589 |
| 5,456,937 A | * | 10/1995 | Chalupa ...................... | 426/573 |
| 5,565,233 A | * | 10/1996 | Alessi ......................... | 426/650 |
| 5,882,644 A | * | 3/1999 | Chang et al. ................ | 426/632 |
| 5,976,587 A | * | 11/1999 | Yamauchi et al. .......... | 426/112 |

OTHER PUBLICATIONS http://www.bchurchill.com, The Food Page Monari Federzoni Balsamic Vinegar Recipes. Copyright 1999.* http://www.acgardens.com/products, American Culinary Gardens Balsamic Soy Sauce and Balsamic Glazing Sauce, Copyright 1998–2001.*

* cited by examiner

*Primary Examiner*—Nina Bhat
(74) *Attorney, Agent, or Firm*—Kramer Levin Naftalis & Frankel LLP

(57) ABSTRACT

A sauce for alimentary use containing, as main ingredient, balsamic vinegar of Modena, combined with thickening agents and sugars. The balsamic sauce offers the advantage of imparting the taste of vinegar directly to those foods, on which regular balsamic vinegar of Modena is not suitable for its high level of acidity and its high fluidity.

4 Claims, No Drawings

BALSAMIC SAUCE FOR ALIMENTARY USE, WITH A BASIS OF BALSAMIC VINEGAR OF MODENA

BACKGROUND OF THE INVENTION

This invention concerns a new balsamic sauce with a basis of balsamic vinegar of Modena.

Balsamic vinegar of Modena has become famous for its typical sour-sweet taste, which is more aromatic than wine vinegar, that is effectively fit to flavour foods like, above all, vegetables.

It effectively exists the need to flavour foods, sometimes different from vegetables, as meat, fish, pasta and others, with the taste of vinegar, which is not suitable for this use as such, due to its high acidity level and its high fluidity that does not allow its permanence on food, so to dress it. Also on the palate, the low consistence of regular balsamic vinegar does not allow it to be effectively used as condiment for foods other than vegetables.

SUMMARY OF THE INVENTION

The main object of this invention is therefore to provide balsamic vinegar of Modena in a suitable version to be used on foods different than vegetables, particularly on meats, fish and pasta.

The balsamic sauce of the invention grants the advantage of imparting the taste of balsamic vinegar of Modena also to those foods, like meat, fish and pasta, that are not suitable to receive this flavouring liquid.

DESCRIPTION OF THE PREFERRED EMBODIMENTS

In this view, the sauce of the invention is prepared combining balsamic vinegar of Modena with thickening agents, preferably composed by modified starch, xantham gum, and sugars preferably composed by, or integrated with, dextrose.

In this way basic preparations are obtained, to which flavouring preparations can be added in different combinations, with meat flavour for the meat taste, with pepper flavour for the pepper taste, with oregano flavour for the pizza taste, with a crustaceans powder and with a shrimp flavour for the fish taste, and with others flavours to obtain other desired tastes.

The finished product, in the appearance of a sauce, is therefore composed by balsamic vinegar of Modena, as a main ingredient, combined with thickening agents, sugars and eventually also with one of the previously cited flavours.

By way of further explanation, the sauce of the present invention contains balsamic vinegar of Modena as a its main ingredient. The sauce may also contain thickening agents to add consistency to the vinegar, and sugars to soften the acid taste of the vinegar. The thickening agent may be based on modified starch and xanthan gum. The sauce may also contain flavoring bases to give a specific aroma or flavor, such as meat flavoring, pepper flavoring, oregano flavoring to give a taste of pizza, and crustaceans powder or shrimp flavor to give a taste of fish. The flavorings may also be rosemary, onions, and garlic. The sauce may contain at least 40% balsamic vinegar of Modena, along with sugars, modified starches and xanthan gum.

Here some examples are given of basic preparations, flavouring preparations and balsamic sauce realized in accordance with the invention. All examples are referred to 1000 grams of product.

Basic Preparations

EXAMPLE 1

Sugar
Dehydrated glucose syrup
Dextrose
Lactose
Maltodextrin
Modified starch
Xanthan gum

EXAMPLE 2

Sugar
Lactose
Salt
Yeast extract in powder
Dehydrated glucose syrup
Maltodextrin
Monosodic glutamate
Modified starch
Xanthan gum

EXAMPLE 3

Sugar
Dextrose
Lactose
Dehydrated glucose syrup
Maltodextrin
Modified starch

Flavouring Preparations

EXAMPLE 4

Rosemary extract
Onion extract
Garlic extract
Meat flavour
Pepper flavour

EXAMPLE 5

Rosemary extract
Onion extract
Garlic extract
Chili flavour

EXAMPLE 6

Garlic extract
Oregano flavour

EXAMPLE 7

Garlic extract
Crustaceans powder
Shrimps flavour

Balsamic Sauce

EXAMPLE 8

Balsamic vinegar of Modena with a salted base includes: balsamic vinegar of Modena, sugar, dehydrated glucose syrup, dextrose, lactose, maltodextrin, modified starch, xanthan gum as stabilizer.

EXAMPLE 9

Balsamic vinegar of Modena with a sweet base includes: balsamic vinegar of Modena, sugar, dextrose, lactose, dehydrated glucose syrup, maltodextrin, water, modified starch.

EXAMPLE 10

Balsamic vinegar of Modena with a fish flavoring includes: balsamic vinegar of Modena, sugar, lactose, water, salt, yeast extract in powder, dehydrated glucose syrup, maltodextrin, monosodic glutamate as taste enhancer, modified starch, flavours, powdered crustaceans (crayfish, crabs), xanthan gum as stabilizer.

EXAMPLE 11

Balsamic vinegar of Modena with a meat flavoring includes: balsamic vinegar of Modena, sugar, lactose, water, salt, yeast extract in powder, dewatered glucose syrup, maltodextrin, monosodic glutamate as taste enhancer, modified starch, aromas, xanthan gum as stabilizer.

EXAMPLE 12

Another embodiment of the flavored balsamic vinegar of Modena includes: balsamic vinegar of Modena, sugar, lactose, water, salt, yeast extract in powder, dehydrated glucose syrup, maltodextrin, monosodic glutamate as taste enhancer, aromas, modified starch, xanthan gum as stabilizer.

EXAMPLE 13

Yet another embodiment of the flavored balsamic vinegar of Modena includes: balsamic vinegar of Modena, sugar, lactose, water, salt, yeast extract in powder, dehydrated glucose syrup, maltodextrin, monosodic glutamate as taste enhancer, modified starch, flavours, xanthan gum as stabilizer.

What is claimed is:

1. A sauce for alimentary use comprising:
   at least 40% balsamic vinegar of Modena;
   a thickening agent, a sugar and
   a flavoring base that includes rosemary extract, onion extract, garlic extract, meat flavor and pepper flavor wherein the thickening agent and the sugar are contained in a basic preparation comprising sugar, lactose, dehydrated glucose syrup, maltodextrin, modified starch. and xanthan gum.

2. A sauce for alimentary use comprising:
   at least 40% balsamic vinegar of Modena;
   a thickening agent, a sugar and
   a flavoring base which comprises at least garlic extract, wherein the thickening agent sad the sugar are contained in a basic preparation comprising sugar, lactose, dehydrated glucose syrup, maltodextrin modified starch and xanthan gum.

3. The sauce according to claim 2, wherein the flavoring base includes oregano flavor.

4. The sauce according to claim 2, wherein the flavoring base includes crustaceans powder and shrimp flavor.

\* \* \* \* \*